United States Patent
Francois et al.

(10) Patent No.: US 8,792,557 B2
(45) Date of Patent: Jul. 29, 2014

(54) METHOD FOR CODING A PICTURE SEQUENCE, CORRESPONDING METHOD FOR RECONSTRUCTION AND STREAM OF CODED DATA REPRESENTATIVE OF SAID SEQUENCE

(75) Inventors: Edouard Francois, Cesson-Sévigné (FR); Dominique Thoreau, Cesson-Sévigné (FR); Shasha Shi, Cesson-Sévigné (FR)

(73) Assignee: Thomson Licensing, Issy les Moulineaux (FR)

( * ) Notice: Subject to any disclaimer, the term of this patent is extended or adjusted under 35 U.S.C. 154(b) by 474 days.

(21) Appl. No.: 13/068,220

(22) Filed: May 5, 2011

(65) Prior Publication Data
US 2011/0274174 A1    Nov. 10, 2011

(30) Foreign Application Priority Data
May 7, 2010  (FR) ..................................... 10 53562

(51) Int. Cl.
    *H04N 7/12*  (2006.01)
(52) U.S. Cl.
    USPC ............. 375/240.16; 375/240.12; 375/240.17
(58) Field of Classification Search
    USPC ...................................... 375/240.01–240.29
    See application file for complete search history.

(56) References Cited

U.S. PATENT DOCUMENTS

| | | | |
|---|---|---|---|
| 8,254,446 B2 * | 8/2012 | Toma et al. | 375/240.12 |
| 8,509,551 B2 * | 8/2013 | Moriya et al. | 375/240.13 |
| 2004/0032908 A1 * | 2/2004 | Hagai et al. | 375/240.25 |
| 2007/0230571 A1 * | 10/2007 | Kodama | 375/240.12 |

OTHER PUBLICATIONS

Ostermann, J. et al., "Video coding with H.264/AVC: Tools, Performance, and Complexity," Circuits and Systems Magazine, IEEE, vol. 4, issue 1, pp. 7-28, 2004 doi: 10.1109/MCAS.2004.1286980.*
Puri, A. et al., "Video coding using the H.264/MPEG-4 AVC compression standard" Signal Processing. Image Communication, Elsevier Science Publishers, Amsterdam, NL doi: 10.1016/J.IMAGE.2004.06.003, vol. 19, No. 9, Oct. 1, 2004, pp. 793-849.*
Schwarz, H. et al., "Overview of the Scalable Extension of the H.264/MPEG-4 AVC Video Coding Standard" ITU Study Group 16—Video Coding Experts Group—ISO/IEC MPEG & ITU-T VCEG (ISO/IEC JTC1/SC29/WG11 and ITU-T SG16 Q6), Oct. 20, 2006.*

(Continued)

*Primary Examiner* — Dave Czekaj
*Assistant Examiner* — Shanika Brumfield
(74) *Attorney, Agent, or Firm* — Tutunjian & Bitetto, P.C.

(57) ABSTRACT

A method for reconstruction of a picture sequence coded in accordance with a coding method specifying a set of coding tools and/or their associated coding parameters is disclosed. The pictures being divided into coding entities. The method for reconstruction according to the invention comprises the following steps for each coding entity coded in INTER mode:
  determining for the coding entity at least one reference picture, and
  reconstructing the coding entity from the at least one reference picture with coding tools configured by coding parameters associated with the coding tools.
Advantageously, the coding tools and/or the associated coding parameters depend on the reference picture.

15 Claims, 2 Drawing Sheets

(56) References Cited

OTHER PUBLICATIONS

Shijun sun, et al., "Motion Vector coding with Global Motion Parameters", ITU Study Group 16—Video Coding Experts Group—ISO/IEC MPEG & ITU-T VCEG (ISO/IEC JTC1/SC29/WG11 and ITU-T SG16 Q6), No. VCEG-N16, Sep. 20, 2001.*

Richardson et al., "A Framework for Fully Configurable Video Coding", Picture Coding Symposium, 2009, May 1, 2009, pp. 1-4.

Schwarz et al., "Overview of the Scalable Extension of the H.264/MPEG-4 AVC Video Coding Standard", Fraunhofer Institute for Telecommunications, Berlin, Germany, Oct. 20, 2006, 20 pages.

Li et al., "Fast Mode Decision Algorithm for Inter-Frame Coding in Fully Scalable Video Coding", IEEE Transactions on Circuits and Systems for Video Technology, vol. 16, No. 7, Jul. 2006, pp. 889-895.

Puri et al., "Video Coding Using the H.264/MPEG-4 AVC Compression Standard", Signal Processing, Image Communication, Amsterdam, NL, vol. 19, No. 9, Oct. 1, 2004, p. 793-849.

Sun et al., "Motion Vector Coding with Global Motion Parameters", ITU Study Group 16—Video Coding Experts Group. Document: VCEG-N16, Sep. 20, 2001, 11 pages.

French Search Report dated Oct. 21, 2010.

* cited by examiner

METHOD FOR CODING A PICTURE SEQUENCE, CORRESPONDING METHOD FOR RECONSTRUCTION AND STREAM OF CODED DATA REPRESENTATIVE OF SAID SEQUENCE

This application claims the benefit, under 35 U.S.C. §119 of FR Patent Application 1053562, filed 7 May 2010.

1. SCOPE OF THE INVENTION

The invention relates to the general domain of picture coding.

The invention relates to a method for coding a picture sequence, a corresponding method for reconstruction and a stream of coded data representative of said picture sequence.

2. PRIOR ART

It is known in the art to code a current picture from a picture sequence by temporal prediction from other pictures of the sequence, known as reference pictures, previously coded and reconstructed. These reference pictures are stored in a buffer.

It is also known in the art to store in such a buffer different versions of a same reference picture, for example one or more filtered versions of this reference picture.

The coding of a current picture implements different coding tools, for example coding modes, quantization, entropy coding, motion compensation which are configured by various parameters. For example, the motion compensation is configured by the precision of motion vectors, the quantization is for example configured by the quantization type that can be uniform or logarithmic.

During the coding of a current picture, respectively during its reconstruction, the coding configuration implemented, that is to say the coding tools and/or the associated coding parameters, are specified according to the current picture to be coded respectively to be reconstructed. For example, the video coding standard H.264/MPEG-4 AVC specifies the coding modes of blocks of a picture according to the type of this current picture. If the current picture is of type I then only the spatial prediction modes (INTRA modes) are authorized, if the current picture is of type P then the mono-directional temporal prediction modes (INTER modes) are authorized in addition to INTRA modes.

The specialisation according to the current picture type to be coded is efficient as it avoids using coding configurations unsuited to the different picture types considered. However, it may be that within a picture or a picture zone, some configurations are used more often and others are used rarely. This requires an extra signalling cost and thus a loss in coding efficiency as even rarely used configurations must be able to be signalled.

3. SUMMARY OF THE INVENTION

The purpose of the invention is to overcome at least one of the disadvantages of the prior art. For this purpose, the invention relates to a method for reconstruction of a picture sequence coded in accordance with a coding method specifying a set of coding tools and/or their associated coding parameters, the pictures being divided into coding entities. The method for reconstruction according to the invention comprises the following steps for each coding entity coded in INTER mode:

determining for the coding entity at least one reference picture, and reconstructing the coding entity from the at least one reference picture with coding tools configured by coding parameters associated with the coding tools.

Advantageously, the coding tools and/or the associated coding parameters depend on the reference picture.

According to a particularly advantageous aspect of the invention, the method for reconstruction also comprises a step for decoding a profile identifier associated with the at least one reference picture, the profile defining a set of coding tools and/or associated coding parameters.

According to a particular aspect of the invention, the profile identifier is decoded from a header of the picture to which the coding entity belongs.

According to another particular aspect of the invention, the profile identifier is decoded from a header of the picture slice to which the coding entity belongs.

According to a particular embodiment, the method for reconstruction also comprises a step of decoding of a number of profiles and, for each profile, of data specifying a set of coding tools and/or coding parameters associated with the tools.

Advantageously the step of reconstruction of the coding entity comprises the following steps:

determining for the coding entity a prediction coding entity by motion compensation of the at least one reference picture, decoding for the coding entity a coefficients coding entity, dequantizing the coefficients coding entity into a dequantized coefficients coding entity, transforming the dequantized coefficients coding entity into a residues coding entity, and merging the prediction coding entity and the residues coding entity to form the reconstructed coding entity.

According to a particular aspect of the invention, when the reference picture is a picture filtered with a low-pass filter, then the coding tools used to reconstruct the coding entity are a subset of the set of coding tools and/or associated coding parameters specified by the coding method.

Advantageously, the subset comprises:

a motion compensation with bilinear interpolation filter and with motion vectors of ½ pixel precision, a uniform quantization with a quantization matrix favouring low frequencies, an entropy coding with scanning of transformed coefficients adapted to the direction of the low-pass filtering of the reference picture.

According to another particular aspect of the invention, when the reference picture is a picture filtered with a filter improving its resolution, then the coding tools and/or associated coding parameters used to reconstruct the coding entity comprise a motion compensation with a polyphase linear interpolation filter and with motion vectors of ⅛ pixel precision.

According to another particular aspect of the invention, when the reference picture is a motion compensated picture according to a model of global motion, then the coding tools used to reconstruct the coding entity comprise the following coding tools and/or associated coding parameters:

motion compensation with bilinear interpolation filter with motion vectors of ⅛ pixel precision having a range limited to N, a partitioning limited to blocks of size 16×16, and a favoured skip mode.

According to a particular characteristic of the invention, N=2.

The invention also relates to a stream of coded data representative of a picture sequence divided into coding entities comprising, in a header associated with at least a part of the picture sequence, an item of data specifying a number of profiles and for each profile data defining a set of coding tools and/or their associated coding parameters and comprising for each picture of the sequence in a header associated with at least a part of the picture, an identifier indicating, for each reference picture used to code the coding entities of the picture part, an associated profile.

The invention also relates to a method for coding a picture sequence, the pictures being divided into coding entities. The method for coding comprises the following steps for each coding entity coded in INTER mode:

determining for the coding entity at least one reference picture, and coding the coding entity from the at least one reference picture with coding tools configured by coding parameters associated with the coding tools. Advantageously, the coding tools and/or the associated coding parameters depend on the reference picture.

4. LIST OF FIGURES

The invention will be better understood and illustrated by means of embodiments and advantageous implementations, by no means limiting, with reference to the figures in the appendix, wherein.

5. DETAILED DESCRIPTION OF THE INVENTION

A picture comprises pixels or picture points with each of which are associated at least one item of picture data. An item of picture data is for example an item of luminance data or an item of chrominance data.

The term "coding entity" designates the basic structure of a picture to be coded or reconstructed. It comprises a subset of pixels of the picture. The set of coding entities of a picture can have or not have common pixels. Generally, the coding entity is a block of pixels. However, the term "coding entity" is generic and can designate a circle, a polygon or a region of any shape. Hereafter the term block is used to simplify the description. However, throughout the description this term can be replaced by the generic term of coding entity.

The term "residue" or "prediction residue" designates the data obtained after extraction of other data. The extraction is generally a subtraction of prediction pixels from source pixels. However, the extraction is more general and comprises notably a weighted subtraction.

The term "reconstructs" designates data (for example pixels, coding entities, blocks) obtained after merging of residues with prediction data. The merge is generally a sum of prediction pixels with residues. However, merging is more general and comprises notably the weighted sum. A reconstructed coding entity is a coding entity comprising reconstructed pixels.

In reference to picture decoding, the terms "reconstruction" and "decoding" are very often used as being synonymous. Thus, a "reconstructed block" is also designated under the terminology of "decoded block".

A picture sequence is generally formed of GOPs (Group Of Picture). Each picture is formed of blocks. Each block generally belongs to a picture slice, which is thus formed of several blocks.

A reference picture used to predict another picture is identified in the sequence using a reference picture index.

According to the invention a reference pictures buffer contains pictures that correspond to different picture types. These pictures can notably correspond to:

"source type" pictures, that is to say pictures previously reconstructed, corresponding to distinct temporal instants, "filtered type" pictures, that is to say filtered versions of pictures previously reconstructed, for example for which the spatial definition is reduced, "compensated type" pictures, that is to say motion compensated versions of previously reconstructed pictures, for example reference pictures compensated by a global motion, etc.

Figure 1:
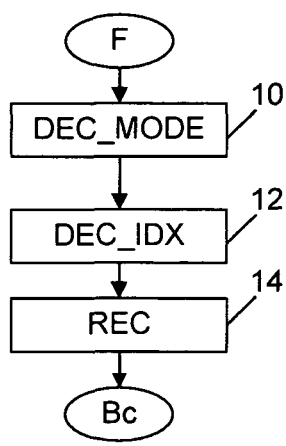
FIG. 1 shows a method for reconstruction according to the invention.
Figure 2:
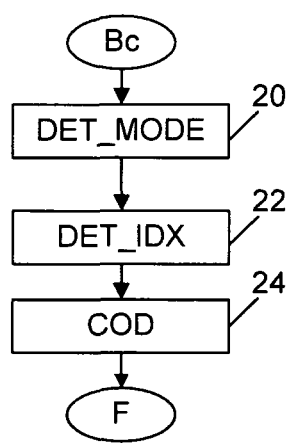
FIG. 2 shows a coding method according to the invention.

The invention relates to a method for reconstruction described in reference to FIG. 1 and a corresponding method for coding described in reference to FIG. 2. According to the invention, the method for coding respectively for reconstruction specializes the process for coding respectively for reconstruction of a current block in INTER mode, i.e. temporally predicted, according to the reference picture used to predict this current block in such way that the process in question dynamically adapts according to the reference pictures used. The coding and reconstruction configurations adapt by modifying the coding tools and/or their associated coding parameters used to code the current block. The example of the following tools can be cited:

INTER type coding modes, for example P mode (mono-directional) pointing to a single reference picture, B mode (bi-directional) pointing to two reference pictures, skip mode that does not require the coding of any motion or residue information, partitioning type that describes a partition of the block, the H.264/MPEG-4 AVC video coding standard defines, for example, for a macroblock the following partitions: 16×16, 16×8, 8×16, 8×8, the 8×8 partitions can themselves be sliced into sub-partitions 8×4, 4×8, 4×4, motion compensation type (for example motion compensation with a bilinear, bi-cubic, de Lanczos, etc. filter) configured by a precision of motion vectors, possibly by a maximum amplitude of these vectors, possibly by the size and the coefficients of interpolation filters, quantization type (uniform, logarithmic, etc.) configured by a quantization step, possibly by a quantization step offset (offset with respect to the step attributed to the picture), possibly by a quantization matrix, possibly by the size of the "dead-zone", transform type of which several versions can be specified in the coding/reconstruction methods (for example Discrete Cosine Transform, Discrete Wavelet Transform, Discrete Sine Transform, Karhunen-Loeve Transform, etc) configured for example by the size of the transform, possibly by the value of the transform coefficients, entropy coding/decoding type (for example Variable Length Coding, Context-Adaptive Binary Arithmetic Coding, Arithmetic Coding) configured notably by a type of scanning type of transform coefficients, in the case of the H.264/MPEG-4 AVC standard, the CABAC (Context-Adaptive Binary Arithmetic Coding) coding is configured notably by contexts, initial probabilities and a probabilities convergence speed.

According to the invention, different profiles are defined according notably to the reference picture types defined above. Each is therefore associated with a reference picture type. Each profile defines a set of coding tools and/or their associated coding parameters. As an example the following profiles are defined:

A generic profile that applies to the "source type" reference pictures and that comprises the standard tools (for example the coding tools specified by the H.264/MPEG-4 AVC standard) with their associated coding parameters.

A low resolution profile that applies to the "filtered type" reference pictures, with low-pass filters, this filter can be isotropic or directional if there is a desire to give priority to a filtering direction. This profile is a subset of the generic profile particularly adapted to the case of "filtered type" reference pictures. This profile comprises the following tools with their associated coding parameters:

motion compensation with a bilinear interpolation filter and with motion vectors of ½ pixel precision, the signal being more "flat", it is of no use to call upon complicated interpolation filters, for the same reason, the motion does not need to be very precise; even more so if the filter applied to generate the reference picture is directional (blurring according to an orientation), the precision of the motion according to this orientation can be reduced though for the perpendicular orientation, the original precision is conserved, uniform quantization with a quantization matrix favouring low frequencies, in fact if it is used as a reference picture, a low-pass filtered picture, this means that a flat texture is favoured thus having few high frequencies, it is thus preferable to favour coding at these low frequencies, entropy coding, whatever the type (that is to say in this case only the coding parameters are specified), with scanning of transformed coefficients adapted to the direction of the low-pass filtering if this filtering is anisotropic, typically, if the low-pass filtering of the reference picture is implemented only according to the horizontal direction, the transformed coefficients will rather present high frequencies according to the vertical axis, it would thus be preferable to give priority to a scanning according to this axis of transformed coefficients, The other coding tools and/or the associated coding parameters of the low resolution profile correspond to those of the generic profile.

A high resolution profile that applies to the "filtered type" reference pictures, with a filter improving its resolution, enabling for example to further increase the contrast, the contours of the reference picture. This profile comprises the following tools with their associated coding parameters:

Motion compensation with polyphase linear interpolation filters (the number of phases being defined by the motion precision) and with motion vectors of ⅛ pixel precision, The other coding tools and/or the associated coding parameters of the high resolution profile correspond to those of the generic profile.

A Global Motion Compensation (GMC) profile that applies to the motion "compensated type" reference pictures on the basis of global motion models. This profile comprises the following tools with their associated coding parameters:

motion compensation with a bilinear interpolation filter, the motion compensation already carried out already enables the signal to be interpreted precisely therefore a simpler interpolation is a priori sufficient, with low range of motion vectors (typically 2 pixels), in fact the reference picture being already motion compensated, the coded motion vector only serves to correct a motion compensation residual error, and with motion vectors of a precision of ⅛ pixel, as the correction of a motion residual error must be able to be precise, 16×16 partitioning only as the global motion compensation is applied over large zones of the picture, Skip mode favoured, that is to say more priority is given to this mode than the other possible modes, The other coding tools and/or the associated coding parameters of the GMC profile correspond to those of the generic profile.

According to other variants, ad'hoc profiles can also be defined.

Ad'hoc profiles are dynamically defined by the coding method following use analysis of reference pictures. For example, during a first coding pass, the set of tools and authorized configurations are used for all the reference pictures. An analysis of tools used according to reference picture type is then carried out. If this analysis demonstrates that tools and/or tool configurations are more specifically used on some reference pictures, adapted profiles can be defined and signalled for these reference pictures. During a second coding pass, the defined profiles are used which augments the coding efficiency due to a reduction in signalling costs. For example, it may appear during a first coding pass that on some reference pictures a given motion compensation type (for example with bilinear filter) is retained in the majority of cases. This motion compensation type is then given priority in the profile of this reference picture for the second coding pass. According to a second example the skip mode is specialised according to the reference picture used. If, for a reference picture, a given coding configuration is used in the majority of cases (for example 16×16 partitioning with AVC interpolation filter and motion vectors of ½ pixel precision) and if for this majority configuration, the prediction residue to be coded is statistically often null, then the skip mode will be associated with this majority configuration, that is to say that a block coded in skip mode is reconstructed by motion compensation of a 16×16 block with an AVC interpolation filter and ½ pixel motion precision.

Figure 3:
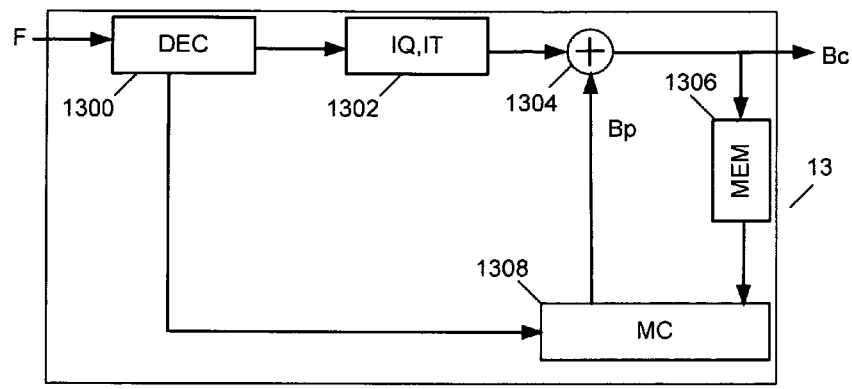
FIG. 3 shows a decoding device according to the invention.

FIG. 1 shows a method for reconstruction of a current block Bc of a current picture Ic of a video sequence presented in the form of a stream F of coded data. The current block also belongs to a current slice Sc. The method for reconstruction is preferentially implemented on a video decoder as shown in FIG. 3.

During a step 10, a coding mode DEC_MODE is decoded for the current block from the stream F.

During a step 12, an index or indexes DEC_IDX of reference pictures from which the current block is predicted is/are decoded for the current block from the stream F when the coding mode of the current block is an INTER mode. According to a variant of this step, the index or indexes of reference pictures from which the current block is predicted is/are determined for the current block from the index or indexes of reference pictures associated with blocks reconstructed previous to the current block that are spatially neighbouring the current block or from the co-located block of the last reconstructed picture.

During a step 14, the current block is reconstructed using coding tools and/or their associated coding parameters determined according to the reference picture or pictures identified by their indexes determined in step 12. For this purpose, for each reference picture used to reconstruct current picture blocks Ic a profile identifier is decoded from the stream F, for example from the header of the picture Ic. According to a variant, for each reference picture used to reconstruct current slice blocks Sc a profile identifier is decoded from the stream F, for example from the header of the slice Sc. Each profile defines a set of coding tools and/or their associated coding parameters. These profiles can for example be specified in the header of the picture sequence or in the header of a group of pictures. Some among them can be defined by default and thus do not have to be in the stream F. Thus, with the indexes of the reference pictures decoded in step 12, the reference pictures of the buffer required for its reconstruction are determined for the current block Bc. With the decoded profile identifiers of the header Ic or Sc, the associated profile and thus the coding tools and/or their associated coding parameters to reconstruct the current block Bc are determined for each reference picture used. In the case where the block is predicted in bi-prediction mode from 2 reference pictures using 2 different profiles, three cases are to be considered:

1. The tools and/or associated coding parameters of two profiles are identical in which case, they can be applied as is,
2. The tools and/or associated coding parameters of two profiles are not concurrent and apply independently on each mono-directional prediction of the bi-prediction mode (for example, the motion compensation applies independently for each mono-directional prediction, as a consequence the interpolation filters and the motion vector precisions for each prediction do not concur), in this case the tools and coding parameters are applied as specified in the profiles, independently for each mono-directional prediction,
3. The tools and/or associated coding parameters specified in each profile are directly concurrent (for example the quantization of prediction residues), in this case the configuration specified in the generic profile is used.

The block Bc is then reconstructed in the standard manner by merging of a temporal prediction block and a residues block. The residues block is obtained by decoding a part of the stream F into a block of coefficients on which is then applied an inverse quantization and possibly an inverse transform.

FIG. 2 shows a method for coding a current block Bc of a current picture of a video sequence presented in the form of a stream F of coded data. The current block also belongs to a current slice Sc. The method for coding is preferentially implemented on a video coder such as that shown in FIG. 4.

During a step 20, a coding mode DET_MODE is determined for the current block.

During a step 22, an index or indexes DET_IDX of reference pictures from which the current block is predicted is/are determined for the current block when the coding mode of the current block is an INTER mode. According to a variant of this step, the index or indexes of reference pictures from which the current block is predicted is/are determined for the current block from the index or indexes of reference pictures associated with blocks coded previous to the current block that are spatially neighbouring the current block or from the co-located block of the last coded picture.

During a step 24, the current block is coded using coding tools and/or their associated coding parameters determined according to the reference picture or pictures identified by their indexes determined in step 22.

With the indexes of reference pictures determined in step 22, the reference pictures of the buffer required for its coding are determined for the current block Bc. According to the type of reference pictures thus determined, the associated profile (s) is/are deduced. For example, if the current block B is predicted from a "filtered" type reference picture with a low-pass filter then the low resolution profile is used. The block Bc is then coded in the standard way by extracting from the current block a temporal prediction block in order to obtain a residues block. The prediction block is obtained by motion compensation of the reference picture with motion vectors. The residues block is then transformed, quantized and coded in the stream F. The fact of using a low resolution profile implicates notably during the motion compensation using motion vectors with a ½ pixel precision and a bilinear interpolation filter.

A profile identifier is also coded in the stream F, for example in the header of the picture Ic, and this for each reference picture used to code the blocks of the current picture Ic. According to a variant, a profile identifier is coded in the stream F, for example in the header of the slice Sc, for each reference picture used to code blocks of the current slice Sc.

Each profile defines a set of coding tools and/or their associated coding parameters. These profiles can for example be specified in the header of the picture sequence or in the header of a group of pictures. Some among them can be defined by default and do not thus have to be in the stream F. With the profile identifiers coded in the header of Ic or of Sc, the associated profile and thus the coding tools and/or their associated coding parameters used to code the current block Bc can thus be determined for each reference picture used.

The invention also relates to a stream of coded data or coded data structure representative of a picture sequence comprising in a header associated with the sequence or a part of this sequence, that is to say with a group of pictures, an item of data defining a number of profiles and comprising for each profile data defining a set of coding tools and/or their associated coding parameters. The stream of coded data also comprises in the header of each picture Ic or each picture slice Sc an identifier indicating, for each reference picture used to code the blocks of this picture Ic respectively of this slice Sc, the profile that is associated with it.

FIG. 3 diagrammatically shows a decoding device 13. The decoding device 13 receives at input a stream F representative of a picture. The stream F is for example transmitted by a coding device 12 via a channel. The decoding device 13 is able to implement the reconstruction method according to the invention described in reference to FIG. 1. The decoding device 13 comprises an entropy decoding module 1300 able to generate decoded data. The decoded data are then transmitted to a module 1302 able to carry out an inverse quantization IQ followed by an inverse transform IT. The module 1302 is connected to a calculation module 1304 able to merge the block from the module 1302 and a prediction block Bp to generate a reconstructed current block Bc that is stored in a memory 1306. The decoding device 13 also comprises a motion compensation module 1308. The motion compensation module 1308 determines a prediction block Bp from picture data already reconstructed stored in the memory 1306 and from decoded motion data transmitted by the entropy decoding module 1300. The modules of the decoding device 1300, 1302 and 1308 use coding tools and/or associated coding parameters determined according to step 14 of the method for reconstruction.

Figure 4:
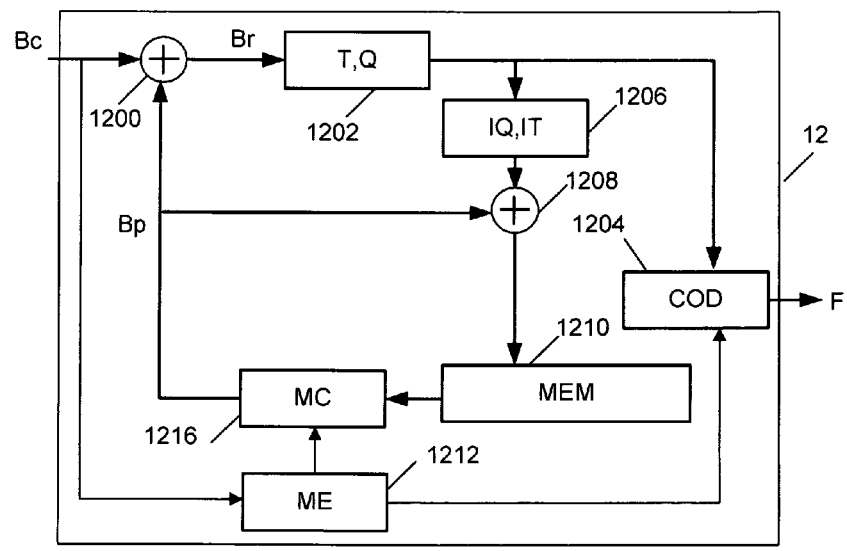
FIG. 4 shows a coding device according to the invention.

FIG. 4 diagrammatically shows a coding device 12. The coding device 12 receives at input a picture or pictures. The coding device 12 is able to implement the coding method according to the invention described in reference to FIG. 2. Each picture is divided into blocks of pixels with each of which is associated at least one item of picture data. The coding device 12 notably implements a coding with temporal prediction. Only the modules of the coding device 12 relating to the coding by temporal prediction or INTER coding are shown in FIG. 4. Other modules known by those skilled in the art of video coders are not shown (for example selection of the coding mode, spatial prediction). The coding device 12 notably comprises a calculation module 1200 able to extract from a current block Bc a prediction block Bp to generate a residue block Br. It further comprises a module 1202 able to transform then quantize the residue block Br into quantized data. The coding device 12 also comprises an entropy coding module 1204 able to code quantized data in a stream F. It also comprises a module 1206 carrying out the inverse operation of the module 1202. The module 1206 is identical to the module 1302 of the decoding device 13. The module 1206 carries out an inverse quantization IQ followed by an inverse transform IT. The module 1206 is connected to a calculation module 1208 able to merge the block of data from the module 1206 and the prediction block Bp to generate a reconstructed block that is stored in a memory 1210. A motion compensation module 1216 determines the prediction block Bp from picture data already reconstructed stored in the memory 1210 and from motion data (i.e. motion vectors and reference picture indexes) determined by a motion estimation module 1212. The modules of the coding device 1202, 1204, 1206 and 1216 use coding tools and/or associated coding parameters determined according to step 24 of the coding method.

The tools and coding parameters mentioned previously are not exhaustive. Other tools and coding parameters can be considered and used in the scope of the invention. For example, the prediction type of the motion vector can be cited (for example the "Template Matching" predictor or the median of neighbouring vectors, or the vector from the co-located block, etc.) configured for example by a number of predictors

What is claimed is:

1. A method for reconstruction of a picture sequence coded in accordance with a method for coding specifying a set of coding tools and/or their associated coding parameters, said pictures being divided into coding entities comprising:
   determining for a coding entity coded in INTER mode at least one reference picture, said coding entity belonging to a part of the picture,
   decoding, from a header associated with said part of the picture one single profile identifier for each reference picture used to reconstruct coding entities of said part of the picture;
   reconstructing said coding entity from the at least one reference picture with coding tools configured by coding parameters associated with said coding tools, wherein said coding tools and/or their associated coding parameters are defined by the profile identified by said single profile identifier.

2. A method for reconstruction according to claim 1, further comprising decoding, from a header associated with at least a part of said picture sequence which comprises at least one picture, an item of data specifying a number of profiles, each profile being associated with one single reference picture type, and, for each profile, data defining a set of coding tools and/or their associated coding parameters.

3. A method for reconstruction according to claim 1, wherein said part of the picture is a slice and wherein said header associated with said part of the picture is a slice header.

4. A method for reconstruction according claim 1, wherein said reference picture type belongs to the set of picture type: source picture; filtered picture; and motion compensated picture.

5. A method for reconstruction according to claim 1, wherein reconstructing said coding entity comprises:
   determining for said coding entity a prediction coding entity by motion compensation of the at least one reference picture,
   decoding for said coding entity a coding entity of coefficients,
   dequantizing said coefficients coding entity into a dequantized coefficients coding entity,
   transforming said dequantized coefficients coding entity into a residues coding entity, and
   merging said prediction coding entity and said residues coding entity to form said reconstructed coding entity.

6. A method for reconstruction according to claim 1, wherein when the reference picture is a picture filtered with a low-pass filter, then said coding tools used to reconstruct said coding entity are a subset of the set of coding tools and/or associated coding parameters specified by said coding method.

7. A method for reconstruction according to claim 6, wherein said subset comprises:
   a motion compensation with bilinear interpolation filter and with motion vectors of ½ pixel precision,
   a uniform quantization with quantization matrix favouring low frequencies,
   an entropy coding with scanning of transformed coefficients adapted to the direction of the low-pass filtering of said reference picture.

8. A method for reconstruction according to claim 1, wherein when the reference picture is a picture filtered with a filter improving its resolution, then said coding tools and/or associated coding parameters used to reconstruct said coding entity comprise a motion compensation with a polyphase linear interpolation filter and with motion vectors of ⅛ pixel precision.

9. A method for reconstruction according to claim 1, wherein when the reference picture is a motion compensated picture according to a model of global motion, then said coding tools used to reconstruct said coding entity comprise the following coding tools and/or associated coding parameters: motion compensation with bilinear interpolation filter with motion vectors of ⅛ pixel precision having a range limited to N, a partitioning limited to blocks of size 16×16, and more priority given to skip mode.

10. A method for reconstruction according to claim 9, wherein N=2.

11. A method for coding a picture sequence, said pictures being divided into coding entities comprising:
   determining for a coding entity coded in INTER mode at least one reference picture, said coding entity belonging to a part of the picture,
   coding said coding entity from the at least one reference picture with coding tools configured by coding parameters associated with said coding tools; and
   coding, in a header associated with said part of the picture to, one single profile identifier for each reference picture used to code coding entities of said part of the picture, wherein said coding tools and/or their associated coding parameters are defined by the profile identified by said single profile identifier.

12. The method for reconstruction according to claim 1, wherein said part of the picture is the picture itself and wherein said header associated with said part of the picture is a picture header.

13. The method for coding according to claim 11, further comprising coding, in a header associated with at least a part of said picture sequence which comprises at least one picture, an item of data specifying a number of profiles, each profile being associated with a one single reference picture type, and, for each profile, a set of coding tools and/or their associated coding parameter.

14. A decoding device for reconstructing a picture sequence coded in accordance with a method for coding specifying a set of coding tools and/or their associated coding parameters, each picture being divided into coding entities comprising:
- a module configured to determine for a coding entity coded in INTER mode at least one reference picture said coding entity belonging to a part of the picture,
- a module configured to decode, from a header associated with said part of the picture, one single profile identifier for each reference picture used to reconstruct coding entities of said part of the picture;
- a module configured to reconstruct said coding entity from the at least one reference picture with coding tools configured by coding parameters associated with said coding tools, wherein said coding tools and/or their associated coding parameters are defined by the profile identified by said single profile identifier.

15. A coding device for coding a picture sequence, said pictures being divided into coding entities comprising:
- a module configured to determine for a coding entity coded in INTER mode at least one reference picture, said coding entity belonging to a part of the picture,
- a module configured to code said coding entity from the at least one reference picture with coding tools configured by coding parameters associated with said coding tools, and
- a module configured to code, in a header associated with said part of the picture, one single profile identifier for each reference picture used to code coding entities of said part of the picture, wherein said coding tools and/or their associated coding parameters are defined by the profile identified by said single profile identifier.

* * * * *